G. ROBERTSON.
FISHING SPOON.
APPLICATION FILED JUNE 29, 1914.

1,179,964.  Patented Apr. 18, 1916.

WITNESSES:
John J. Schrott
Mae E. Immich

INVENTOR
Gilbert Robertson,
BY
Fred J. Dieterich
ATTORNEYS

UNITED STATES PATENT OFFICE.

GILBERT ROBERTSON, OF VANCOUVER, BRITISH COLUMBIA, CANADA.

FISHING-SPOON.

1,179,964.  Specification of Letters Patent.  Patented Apr. 18, 1916.

Application filed June 29, 1914. Serial No. 847,913.

*To all whom it may concern:*

Be it known that I, GILBERT ROBERTSON, a citizen of the Dominion of Canada, residing at Vancouver, in the Province of British Columbia, Canada, have invented certain new and useful Improvements in Fishing-Spoons, of which the following is a specification.

This invention relates to a fishing spoon which has been particularly designed for the salmon on the Pacific Coast.

The improvement is directed to the particular form of the spoon by which a quick erratic lateral movement of the spoon is effected. The form is also such that comparatively small concentrated high lights are obtained.

Figure 1:
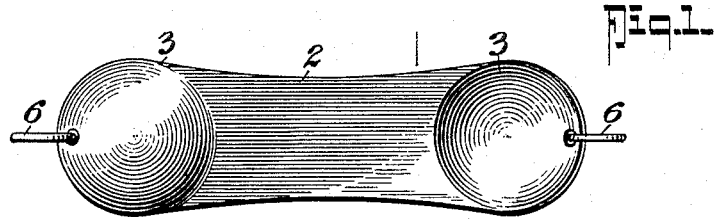
Figure 2:

The invention is particularly described in the following specification, reference being made to the drawings by which it is accompanied, in which:

Figure 1 is a face view of the spoon as it is supported in the water. Fig. 2 is a horizontal section of the same, and Fig. 3 is a face view of the other side.

The spoon consists of an elongated body 2 of thin sheet metal which is cupped, as at 3, to a segment of a sphere at each end from an opposite face, the rim of each segment being coincident with the plane of the surface from which it is stamped. Between the spherical ends 3 the width of the body 2 is reduced slightly toward the middle. The line swivel 4 is attached to one end and the hook 5 to the other, each by an oval link 6, the size of the aperture in each end of the spoon and the width of the link being such, that the link will move freely in the aperture without risk of it kinking or binding therein.

Figure 3:
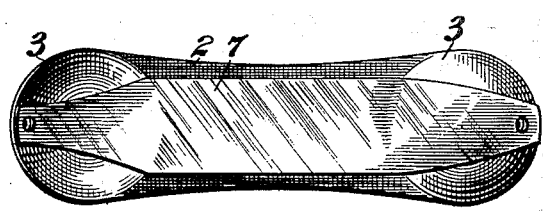

Along the medial line of one side of the spoon, see Fig. 3, a raised portion 7 is secured or embossed, the width of which raised portion is narrower than that of the body of the spoon so as to leave a border on each side from end to end. At each end where it passes around the outer surface of the spherical segment at one end and around the inner surface of the segment at the other, this raised portion is reduced in width by a gradual taper. The raised portion 7 is polished bright and that portion of the body 2 surrounding it is oxidized or darkened.

I am aware that prior to my invention fishing spoons have been shaped as an elongated body, the ends of which have been bent and cupped slightly to opposite sides so as to impart a sinuous or erratic lateral movement to the spoon as it is drawn through the water. It will be noticed, however, that the body of the spoon is not laterally bent as the edge of each cupped end and the body 2 intermediate of the ends are in one plane.

I am unable to state positively wherein lies the superiority of this spoon but believe it to be due to the short erratic lateral movement of it and to the bright band along one side, the border of which band is dark. The superiority of one bait over another sometimes depends on apparently trifling features but it is not always easy to explain why these features are advantageous.

Having now particularly described my invention, I hereby declare that what I claim as new and desire to be protected in by Letters Patent, is:

1. A fishing spoon comprising a flat elongated body of thin sheet metal, the ends of which are provided with cup shaped depressions on opposite sides thereof, means for connecting a line swivel to one end of said body and a hook to the other end of the same, substantially as shown and described.

2. A fishing spoon comprising a flat elongated body of thin sheet metal with cup shaped depressions in the ends thereof and on opposite sides thereof, means for connecting a line swivel to one end of the body and a hook to the other end of the same, said body having a bright strip-like portion on one side of less width than that of the body as a whole whereby to expose a portion of the body, said exposed portion of the body to be darkened to effect a contrast with the bright strip-like portion, said strip-like portion extending over and conforming to the cup shaped depressions to the ends of the body, said strip tapering toward its ends where it passes over said cup shaped depressions, substantially as shown and described.

In testimony whereof I affix my signature in presence of two witnesses.

GILBERT ROBERTSON.

Witnesses:
ROWLAND BRITTAIN,
MAY WHYTE.